United States Patent
Oketani et al.

(10) Patent No.: US 6,664,703 B2
(45) Date of Patent: Dec. 16, 2003

(54) STATOR FOR ROTARY MACHINE AND METHOD OF MANUFACTURING THE STATOR

(75) Inventors: Naohiro Oketani, Tokyo (JP); Takushi Takizawa, Tokyo (JP); Hiroki Katayama, Tokyo (JP); Atsushi Oohashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 9 days.

(21) Appl. No.: 09/906,115

(22) Filed: Jul. 17, 2001

(65) Prior Publication Data

US 2002/0130582 A1 Sep. 19, 2002

(30) Foreign Application Priority Data

Mar. 15, 2001 (JP) .................................... P2001-073860

(51) Int. Cl.[7] ................................................ H02K 1/16
(52) U.S. Cl. ............................ 310/254; 310/42; 29/596
(58) Field of Search ....................... 310/42, 254; 29/596

(56) References Cited

U.S. PATENT DOCUMENTS

| | | | |
|---|---|---|---|
| 3,078,288 A | 2/1963 | Olson | 260/414 |
| 3,646,374 A | 2/1972 | Jordan et al. | |
| 4,102,040 A * | 7/1978 | Rich | |
| 4,160,926 A | 7/1979 | Cope et al. | |
| 4,665,329 A * | 5/1987 | Raschbichler | 310/13 |
| 5,134,327 A | 7/1992 | Sumi et al. | |
| 5,477,096 A * | 12/1995 | Sakashita et al. | 310/216 |
| 5,592,731 A * | 1/1997 | Huang et al. | 29/596 |
| 5,663,601 A * | 9/1997 | Wakabayashi et al. | 310/179 |
| 6,072,259 A * | 6/2000 | Kawabata et al. | 310/216 |
| 6,317,962 B1 * | 11/2001 | Adachi et al. | 29/596 |
| 6,335,583 B1 * | 1/2002 | Kusase et al. | 310/201 |

FOREIGN PATENT DOCUMENTS

| | | |
|---|---|---|
| DE | 1763506 | 11/1971 |
| DE | 19633399 A1 | 2/1998 |
| FR | 1332362 A | 7/1963 |
| GB | 2108772 A | 5/1983 |
| JP | 56068251 | 6/1981 |
| JP | 585054856 | 3/1983 |
| JP | 09103052 | 4/1997 |
| JP | 11018378 | 1/1999 |

* cited by examiner

Primary Examiner—Burton Mullins
(74) Attorney, Agent, or Firm—Sughrue Mion, PLLC

(57) ABSTRACT

A stator for a rotary machine includes a rotor 7 and a stator 8 having a stator iron core 15 disposed oppositely around the outer circumference of the rotor 7 and a stator coil 16 fitted around the iron core 15, wherein the iron core 15 has a laminated iron core 150 with plural axially extending slots 15a formed circumferentially at predetermined pitches, an insulating resin 100 is coated on an axial end face 15f of the iron core 15 and an inner wall face of a slot 15a in the laminated iron core 150 to provide insulation between the iron core 15 and the stator coil 16, and the iron core is cylindrically shaped by bringing both circumferential end portions 15g of the laminated iron core 150 into contact to bend the laminated iron core 150 so that an opening face 15b of the slot 15a is directed inside.

4 Claims, 17 Drawing Sheets

P PORTION      Q PORTION

C-C SECTION     D-D SECTION

STATOR FOR ROTARY MACHINE AND METHOD OF MANUFACTURING THE STATOR

BACKGROUND OF THE INVENTION

1. Field of the Invention

The present invention relates to a stator for a rotary machine that is driven by an internal combustion engine for the vehicle, for example, and a method for manufacturing the stator.

2. Description of the Related Art

FIG. 13 is a perspective view showing the conventional rotary machine (alternator for vehicle) as disclosed in U.S. Pat. No. 3,078,288, for example. In FIG. 13, a rotor 7 of landau type is rotatably attached via a shaft 6 within a case 3 composed of a front bracket 1 and a rear bracket 2, and a stator 8 is supported on an inner wall face of the case 3 to cover the outer circumferential side of the rotor 7. The shaft 6 is rotatably supported by the front bracket 1 and the rear bracket 2. A pulley 4 is secured at one end of this shaft 6 to allow a rotational torque of the engine to be transmitted via a belt (not shown) to the shaft 6. A slip ring 9 for supplying a current to the rotor 7 is secured to the other end of the shaft 6, and a pair of brushes 10 are accommodated within a brush holder 11 disposed within the case 3 to slide with the slip ring 9. A regulator 18 for regulating the magnitude of an AC voltage produced in the stator 8 is connected to a heat sink 17 fitted with a brush holder 11. A rectifier 12 electrically connected to the stator 8 for rectifying the alternating current produced in the stator 8 to the direct current is mounted within the case 3.

The rotor 7 comprises a rotor coil 13 for producing a magnetic flux by passing a current, and a pair of pole cores 20, 21, provided to cover the rotor coil 13, for forming the magnetic poles due to the magnetic flux produced by the rotor coil 13. One pair of pole cores 20, 21 made of iron have eight pawl-like magnetic poles 22, 23 projected around the outer circumferential edge at an equiangular pitch in a circumferential direction, and are oppositely secured to the shaft 6 to mate the pawl-like magnetic poles 22, 23. Further, the fans 5 are secured to both axial ends of the rotor 7. Also, the suction holes 1a, 2a are provided on the axial end faces of the front bracket 1 and the rear bracket 2, and the exhaust holes 1b, 2b are provided on both shoulder portions of the front bracket 1 and the rear bracket 2 around the outer circumference, opposed to the radial outside of the coil end groups 16a, 16b on the front side and the rear side of the stator coil 16.

The stator 8 comprises a stator iron core 15 composed of a cylindrical laminated iron core with a plurality of axially extending slots 15a being formed at a predetermined pitch in the circumferential direction, a polyphase stator coil 16 wound around the stator iron core 15, and an insulating paper 19, fitted with in each slot 15a, for electrically insulating between the polyphase stator coil 16 and the stator iron core 15 as shown in FIG. 14. And the polyphase stator coil group 16 has a plurality of coils, each of which is wave wound to take alternately an inner layer and an outer layer in a slot depth direction within the slot 15a for every predetermined number of slots, one element wire 30 being folded back outside the slot 15a on the end face side of the stator iron core 15. Herein, the stator iron core 15 to receive two pairs of three-phase stator coils 16, corresponding to the number of magnetic poles (16) for the rotor 7, so that 96 slots 15a are formed at equal interval. For the element wire 30, a long copper wire material having a rectangular cross section covered with an insulated material is employed, for example.

A method for manufacturing the stator 8 will be specifically described below with reference to FIGS. 15 to 21. First of all, 12 long element wires 30 are bent into the shapes of stylized bolts of lightning, (hereinafter described as the shape of a lightning bolt) on the same plane at the same time, as shown in FIG. 15. Then, they are folded over by a jig in a right angle direction, as indicated by the arrow in FIG. 16, and an element wire group 30A is fabricated as shown in FIGS. 17A and 17B. Similarly, an element wire group 30B having a transition connection and a lead wire are fabricated, as shown in FIGS. 18A and 18B. The element wire groups 30A, 30B are composed of six pairs of element wires, shifted by one slot pitch, each pair of element wires being arranged in such a way that two element wires 30 formed in this pattern are shifted by a pitch of 6 slots from each other and superposed in a straight part 30b, as shown in FIG. 21. And six end wires of the element wire 30 extend out on either side at either end of the element wire groups 30A, 30B. Also, the turn portions 30a are aligned at either side portion of the element wire groups 30A, 30B.

On the other hand, a certain number of main laminated plates 15d made of an SPCC material having a trapezoidal slot 15a and the teeth 15c formed at a predetermined pitch (an electrical angle of 30°) are laminated, and laser welded at a predetermined position on the outer circumference, thereby producing a laminated iron core 150 of roughly rectangular parallelopiped.

As shown in FIGS. 20A and 21, the insulating paper 19 is fitted into the slot 15a of an iron core 36, each straight section of two element wire groups 30A, 30B superposed being pushed into each slot 15a. Thereby, two element wire groups 30A, 30B are attached around the laminated iron core 150, as shown in FIG. 20B. At this time, the straight portion 30b of the element wire 30 is insulated from the laminated iron core 150 by the insulating paper 19, and accommodated within the slot 15a, four wires being aligned radially. Also, two element wire groups 30A, 30B are fitted in superposition around the laminated iron core 150, as shown in FIG. 21. Then, the laminated iron core 150 is rounded, the end faces 15 being brought into contact with each other and welded together, whereby the cylindrical stator 8 is produced as shown in FIG. 20C.

However, in the conventional alternator for the vehicle, since the insulation between the stator coil group 16 and the stator iron core 15 was made by the insulating paper 19, as described above, there was a problem that the material cost of the insulating paper 19 was taken, a greater number of steps were required, and the costs were increased. Also, there was a further problem that the insulation process such as coating was required as another step on a portion where the iron core portion was exposed, thereby increasing the number of steps.

At a step of forming the stator iron core 15 cylindrically, an excessive stress occurs in the teeth 15c of the stator iron core 15, and a laminated steel plate making up the teeth 15c is deformed and shifted circumferentially on the inner diameter side of the stator iron core 15, disordering a magnetic circuit, resulting in a problem of lower output voltage. And since the insulation between the stator iron core 15 and the stator coil 16 is made by the insulating paper 19, when the teeth 15c is deformed, the insulating paper 19 is ruptured, resulting in a problem of causing a short-circuit with the stator coil 16.

When the stator coil group 16 is inserted in the slot 15a of the stator iron core 15 in a direction of the arrow A, as shown in FIG. 21, or when molding the stator iron core cylindrically, as shown in FIG. 20C, a reaction force from the stator coil group 16 is exerted. In particular, the stator iron core 15 is molded cylindrically around the neutral axis on the almost central portion of the core pack, whereas each coil group 16 is deformed cylindrically around the neutral axis of each coil group 16. Therefore, the displacement of the stator iron core 15 and each coil group 16 are different, so that a greater stress is exerted on the teeth 15c. Accordingly, a contact occurs between the opening edge of the axial end face for the stator iron core 15 and the stator coil group 16, and the insulating paper and the insulation film for the stator coil group 16 are exfoliated, resulting in a problem of causing a pressure-proofing failure.

Further, the insulating paper 19 is interposed between the stator iron core 15 and the stator coil group 16, whereby there is a gap between the inner wall face of the slot 15a and the insulating paper 19. Therefore, due to an insulation failure caused by a dislocation when inserting the stator coil group 16, or the water content permeating into the gap, or a bad thermal conduction (coolness) between the stator coil group 16 that is a heat generating body and the stator iron core 15, there was a problem that the alternator for vehicle was degraded in quality.

SUMMARY OF THE INVENTION

This invention has been achieved in the light of the aforementioned problems, and it is an object of the invention to provide a stator for a rotary machine and a method for manufacturing the stator, in which the stator has a high insulation and cooling performance, and can be produced in simple manner, with high quality and lower costs.

To achieve the above object, according to this invention, there is provided a stator for a rotary machine comprising a rotor and a stator having a stator iron core disposed opposite around the outer circumference of the rotor and a stator coil fitted around the stator iron core, wherein the stator iron core has a laminated iron core with a plurality of axially extending slots formed at a predetermined pitch along a circumferential direction, an insulating resin is coated at least on an axial end face of the stator iron core and an inner wall face of a slot in the laminated iron core to provide insulation between the stator iron core and the stator coil, and the laminated iron core is formed in a cylindrical shape by bringing both circumferential end portions of the laminated iron core into contact with each other in such a way as to bend the laminated iron core so that an open face of the slot on the inner circumferential side may be directed inside.

The insulating resin is coated thicker on the axial end face of the stator iron core than on the inner wall face of the slot on the axially central portion.

The insulating resin is coated thicker near an opening face of the stator iron core on the inner circumferential side than any other portion of the inner wall face of the slot.

The insulating resin is coated to take an R shape or chamfered shape on the axial end face of the stator iron core.

The insulating resin is coated to take an R shape or chamfered shape on the axial end face of the stator iron core.

The insulating resin on the axial end face of the stator iron core is coated thicker on the inner diameter side of a core back neutral with respect to the axis than on the outer diameter side.

The insulating resin on the inner wall face of the slot is coated thinner on the outer circumferential side of the stator iron core than any other portion of the inner wall face.

A notch is provided on the inner wall face of the slot on the outer circumferential side of the stator iron core, and the insulating resin is coated thinner in the notch than any other portion of the inner wall face.

The axial end face of the stator iron core is formed in an irregular formation.

The inner wall face of the slot is formed in the irregular formation.

The insulating resin is coated thinner on both ends of the laminated iron core in the circumferential direction than any other portion of the laminated iron core.

The insulating resin is an epoxy based insulation resin, or a silicone based insulating resin.

The stator coil is inserted into the slot to be aligned in one row in a diameter direction of the stator iron core.

The stator coil has a substantially rectangular shape in cross section.

The stator coil has a plurality of coils folded back outside the slot on the end face side of the stator iron core and wound to take alternately an inner layer and an outer layer in a slot depth direction within the slot for every predetermined number of slots, and a turn portion of the coil element wire folded back outside the slot on the end face side of the stator iron core is aligned in the circumferential direction to constitute a coil end group.

According to this invention, there is provided a method for manufacturing a stator for a rotary machine including a step of forming a laminated iron core by laminating a straight steel plate sheet with a slot shape punched, a step of coating an insulating resin at least on an axial end face of a stator iron core and on an inner wall face of a slot in the laminated iron core, a step of forming the cylindrical stator iron core by placing the both circumferential ends of the laminated iron core coated with the insulating resin into contact with each other, and a step of winding a stator coil around the stator iron core.

Also, according to this invention, there is provided a method for manufacturing a stator for a rotary machine including a step of forming a laminated iron core by laminating a straight steel plate sheet with a slot shape punched, a step of coating an insulating resin at least on an axial end face of a stator iron core and on an inner wall face of a slot in the laminated iron core, a step of winding a stator coil around the laminated iron core coated with the insulating resin, and a step of forming the cylindrical stator iron core by placing both circumferential ends of the laminated iron core having the stator coil wound into contact with each other.

The insulating resin is applied by electrostatic powder coating.

The insulating resin is applied from an opening face of the slot on the inner circumferential side of the stator iron core.

The insulating resin is applied on the stator iron core in an axial direction.

The stator coil is molded beforehand in an arranged state within the slot, and then inserted into the slot.

DETAILED DESCRIPTION OF THE PREFERRED EMBODIMENTS

Now, a description will be given in more detail of preferred embodiments of the invention with reference to the accompanying drawings.
(Embodiment 1)

Figure 1:
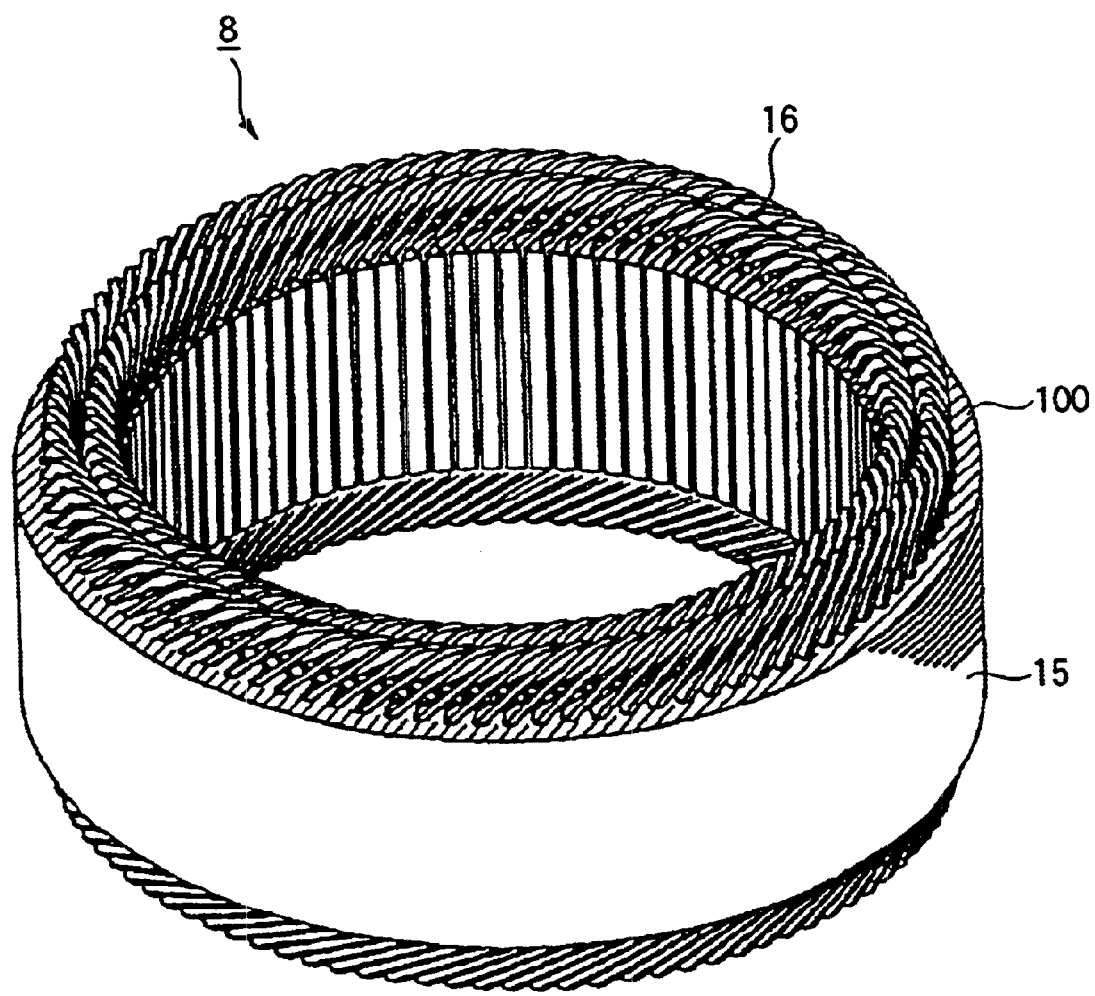
FIG. 1 is a perspective view showing a stator for a rotary machine according to an embodiment 1 of this invention.
Figure 2:
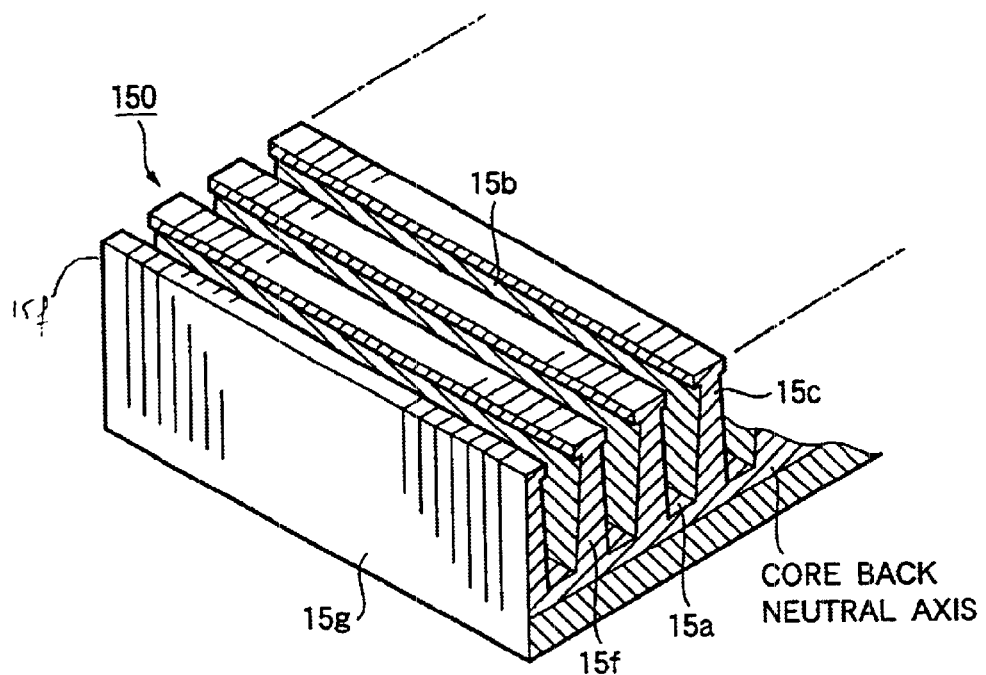
FIG. 2 is a perspective view showing a part of a laminated iron core in the stator for the rotary machine according to the embodiment 1 of this invention.

FIG. 1 is a perspective view showing a stator for a rotary machine according to an embodiment 1 of this invention. FIG. 2 is a perspective view showing a laminated iron core before being molded cylindrically into the stator as shown in FIG. 1. The stator 2 has a stator iron core 15 with SPCC of 0.35 mm laminated, and a stator coil group 16 secured to this stator iron core 15. The stator coil group 16 is composed of a long coil element wire 30 bent into the shape of a lightning bolt, as explained in the prior art. In the prior art, an electrical insulation between the stator coil 16 and an inner wall face of a slot 15a was made by the insulating paper 19. However, in this invention, the insulating paper 19 is dispensed with, and an insulating resin 100 is applied on the stator iron core 15 to provide insulation between the stator coil 15 and the inner wall face of the slot 15a.

Figure 3:
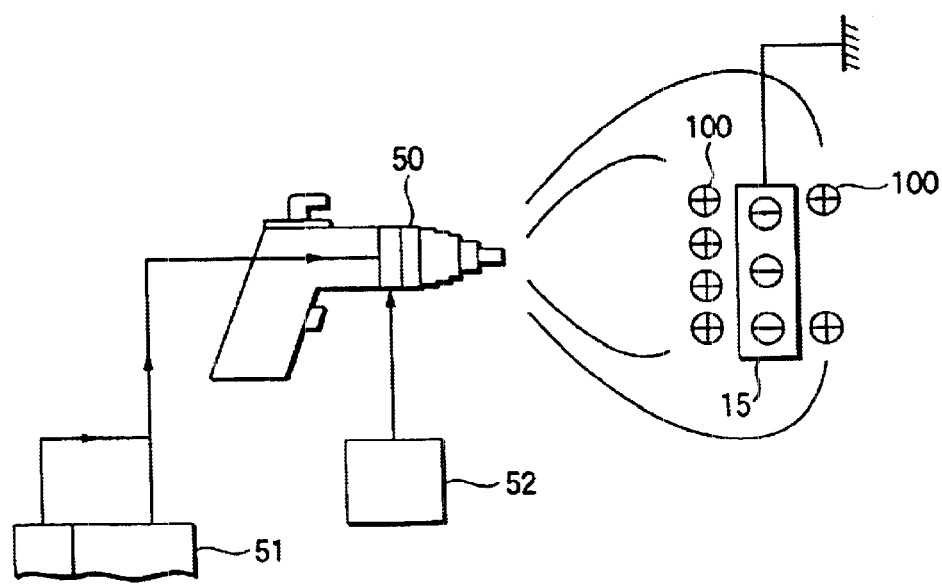
FIG. 3 is a block diagram showing an electrostatic powder coating apparatus for coating an insulating resin to the stator iron core in the stator for the rotary machine according to the embodiment 1 of this invention.

Herein, the application of the insulating resin 100 is desirably made by electrostatic powder coating of an epoxy based insulating resin. The epoxy based insulating resin is more likely to permeate an applied object, and be coated uniformly. FIG. 3 is a schematic diagram for explaining an electrostatic powder coater that is generally well known. As shown in FIG. 3, a powder coating material (herein epoxy resin as the insulating resin 100) supplied to an electrostatic gun 50 by a feeder 51 is electrified at a DC high voltage from an electrostatic voltage generator 52, and the electrified epoxy resin is coated on the applied object (herein a laminated iron core 150) with the air supplied from the feeder 51 to the electrostatic gun 50. The laminated iron core 150 is grounded, and the powder epoxy resin electrified negatively is attached onto the stator iron core 15 with positive electric charges induced due to an electrostatic pulling force. A desired part of the laminated iron core 150 is masked, and the epoxy resin is coated onto a portion corresponding to the stator iron core end face 15f of the laminated iron core 150 and at least a part of the inner wall face of the slot 15a (i.e., a slanting line portion in FIG. 2). After coating the epoxy resin, the epoxy resin applied on the laminated iron core 150 is molten by heating, and hardened in a baking furnace to form a continuous film. Herein, the insulating resin 100 is coated axially on the laminated iron core 150 to form a relative thick film on both end faces 15f in the axial direction.

Figure 4:
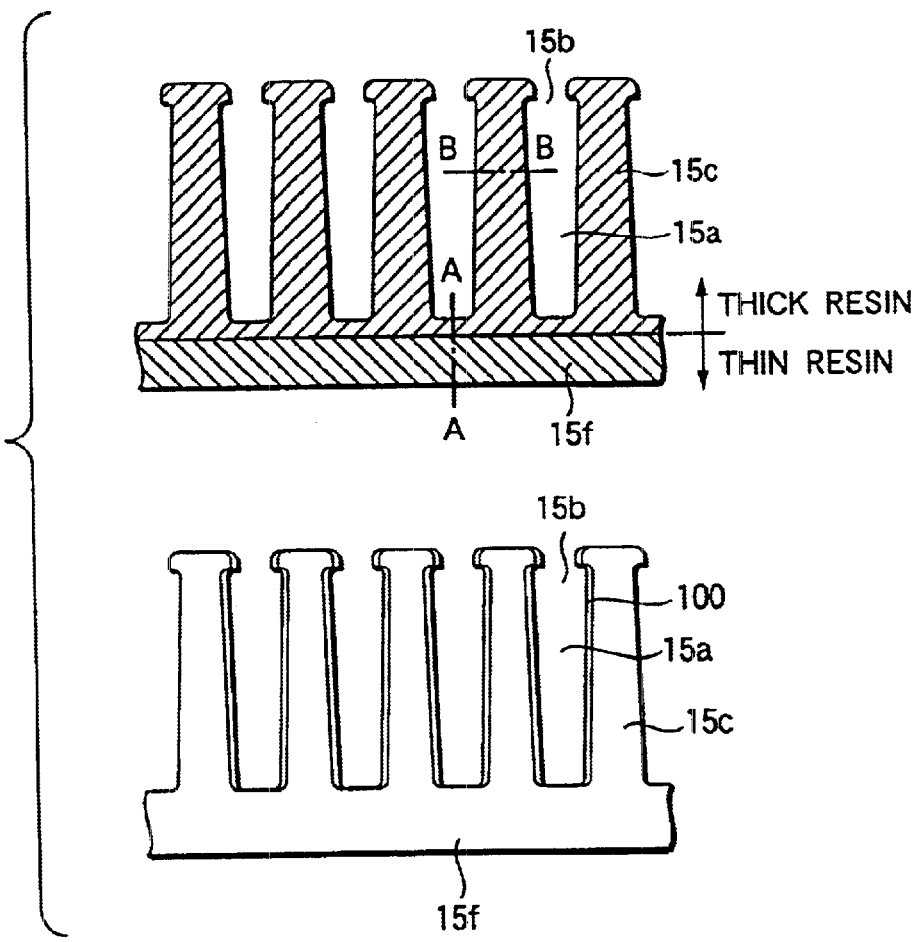
FIG. 4 is an external view and a cross-sectional view showing a part of the laminated iron core in the stator for the rotary machine according to the embodiment 1 of this invention.

As shown in FIG. 4, it is desirable that on the end faces 15f, the insulating resin 100 is coated to be thicker on the inner diameter side of the core back neutral axis (the continuous line connecting the locations without displacement on the end face 15f when the straight laminated iron core 150 is formed cylindrically) than on the outer diameter side. This is because when formed cylindrically, the straight laminated iron core 150 is displaced more on the outer diameter side of I the core back neutral axis than on the inner diameter side, and hence, if the insulating resin 100 is coated too thick, a crack is more likely to occur. Even if the crack occurs on the outer diameter side of the core back neutral axis, the crack can be stopped near the core back neutral axis by coating the insulating resin 100 on the inner diameter side thinner than on the outer diameter side. Accordingly, it is possible to prevent the cracking at the region where the resin crack is undesirable such as the opening edge of the slot 15a.

Figure 5:
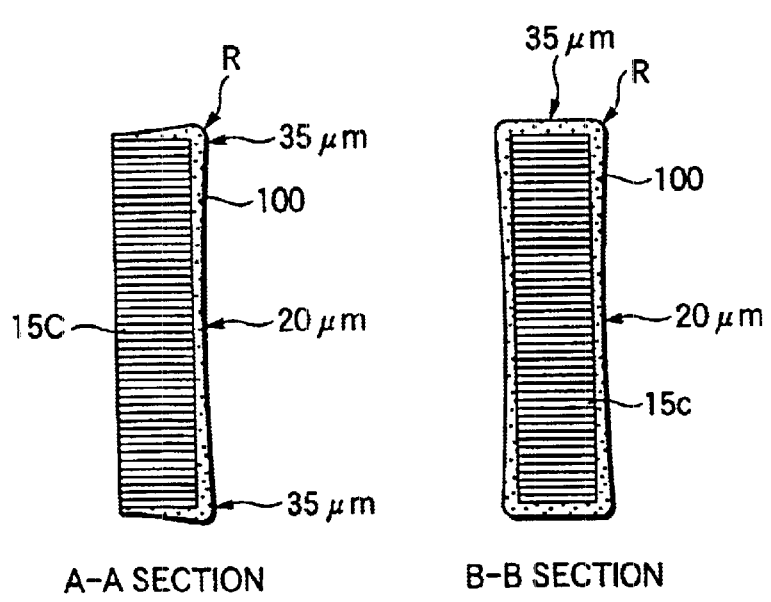
FIG. 5 is a cross-sectional view showing a part of the laminated iron core in the stator for the rotary machine according to the embodiment 1 of this invention.

FIG. 5 shows the axial cross section of the core back and the teeth 15c as shown in FIG. 4. In this embodiment, on the axial end face 15f of the stator 8, the inner diameter side of the core back neutral axis is 35 $\mu$m, the outer diameter side is 20 $\mu$m, and the axial central portion of the inner wall face of the slot 15a is 20 $\mu$m. The insulating resin 100 at the corner portion of axial end face of the slot 15a is of the R shape to prevent the crack from being caused due to interference with the stator coil 16.

It is desirable that the insulating resin 100 is coated to be thinner on the circumferential both end portions 15f of the laminated iron core 150 than any other portion. This is because the insulating resin 100 is likely to cause a crack at the contact portion, and the insulating resin 100 may be exfoliated from the teeth 15c adjacent, when the cylindrical stator iron core 15 is later formed by bringing into contact the circumferential both end portions 15g of the laminated iron core 150. In addition, due to a gap of the contact portion, the magnetic resistance of the stator iron core 15 is aggravated, and has adverse effect on the output. Accordingly, it is desirable that the coating on this portion is suppressed as much as possible by masking.

In this way, the stator coil 16 formed by bending a coil element wire 30 into the shape of a bolt of lightning is inserted into each slot 15a of the laminated iron core 150 obtained by coating the insulating resin 100 as shown in FIGS. 15 to 21 for the conventional example. Herein, when the stator coil 16 is inserted into the slot 15a, it is aligned in one row in the radial direction of the stator iron core 15 within the slot 15a. Thereby, the coil insertion is made regularly, and the stator coil 16 can be prevented from abutting against the inner wall face of the slot 15a, and damaging the insulating resin 100, thereby improving the insulating ability.

Further, along the circumference of both of the end portions 15g of the laminated iron core 150 are brought into contact to form the cylindrical stator iron core 15, and to produce the stator 8 as shown in FIG. 1.

As described above, the electrical insulation between the stator coil 16 and the inner wall face of the slot 15a is made using the insulating resin 100, in place of the insulating paper 19 as conventionally employed. Hence, the following effects can be obtained.

That is, in the conventional example, it took a lot of time to insert the insulating paper 19 as insulating means into the laminated iron core 150. According to this invention, the insulating resin 100 may be coated entirely onto the laminated iron core 150, whereby the laminated iron core 150 can be simply treated for insulation, the operation time is shortened, and additionally the insulating resin 100 is cheaper in the material costs than the insulating paper 19, resulting in the products with the lower costs. Also, since the laminated iron core 150 is straight, the opening portion 15b on the inner circumferential side of the stator iron core 15 for the slot 15a is largely opened, and the insulating resin 100 is easily coated.

Also, because of the coating of the insulating resin 100, the rigidity of the stator iron core 15 is increased to prevent the deformation of the teeth 15c, whereby the stator coil is prevented from causing a short-circuit due to lower output caused by the deformation or rupture of the insulating paper 19. Also, since the rigidity of the stator iron core 15 is increased, the electromagnetic sound can be reduced.

The generated heat of the coil can be efficiently transmitted to the stator iron core 15 via the insulating resin 100, and the cooling effect can be improved. If the insulating paper 19 is employed, due to the low thermal conductivity of the insulating paper itself and because the insulating paper 19 and the inner wall face of the slot 15a are not secured but contacted via the air, the thermal conductivity is reduced. However, since the insulating resin 100 has a higher thermal conductivity than the insulating paper 19, and the insulating resin 100 and the inner wall face of the slot 15a are secured without interposition of the air, the generated heat of the coil can be efficiently transmitted to the stator iron core 15, thereby making it possible to let the heat off to the bracket, and improve the cooling effect.

Also, since the insulating paper 19 and the inner wall face of the slot 15a are not secured together, when the water flows in from the outside, it is apprehended that the water content sticks to the stator iron core 15, producing the rust to cause a false insulation. However, since the insulating resin 100 and the inner wall face of the slot 15a are fully secured, there is a remarkable rust prevention effect because no water content permeates.

In the above embodiment 1, the insulating resin 100 is the epoxy based insulating resin. However, the silicone based insulating resin may be employed. The silicone based insulating resin has a greater attenuation coefficient than the epoxy based insulating resin, giving rise to the effect that the insulating resin 100 is prevented from cracking owing to the rotational oscillation of the generator. Also, the electromagnetic noise can be reduced due to the oscillation attenuation effect.

(Embodiment 2)

Figure 6:
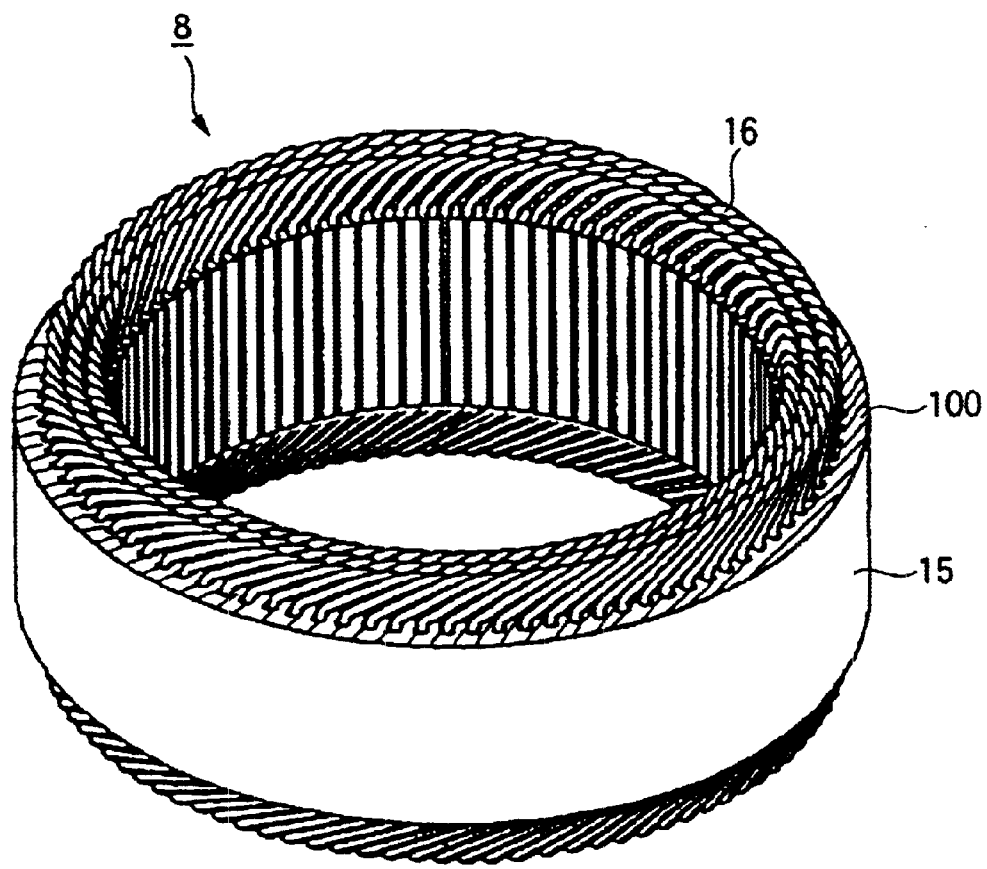
FIG. 6 is a perspective view showing a stator for a rotary machine according to an embodiment 2 of this invention.
Figure 7:
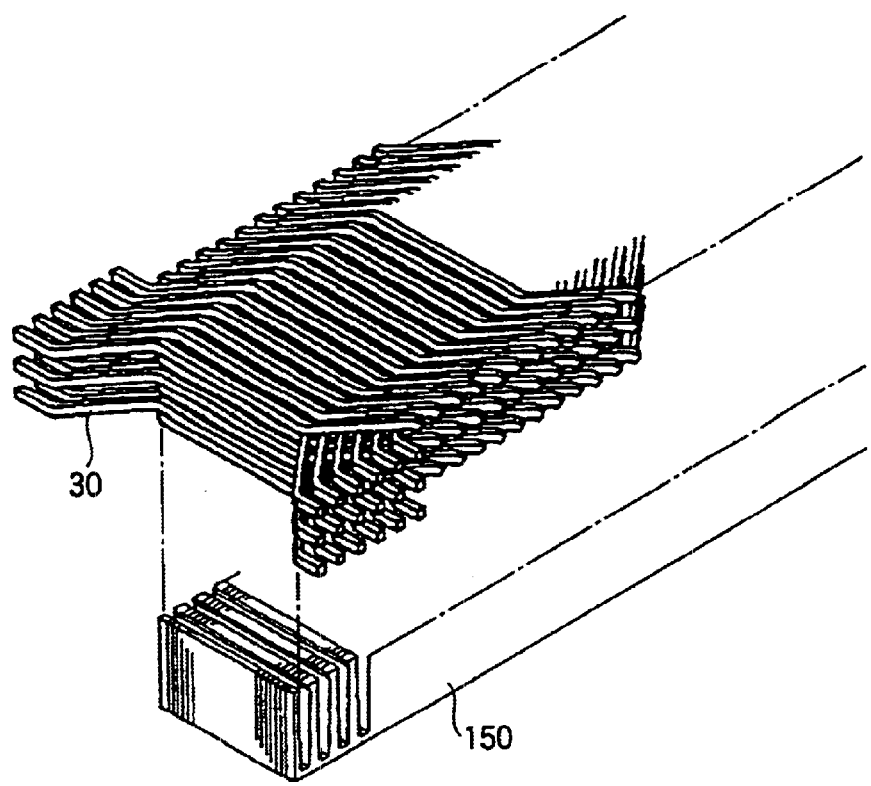
FIG. 7 is a perspective view showing a method of assembling the stator for the rotary machine according to the embodiment 2 of this invention.
Figure 8:
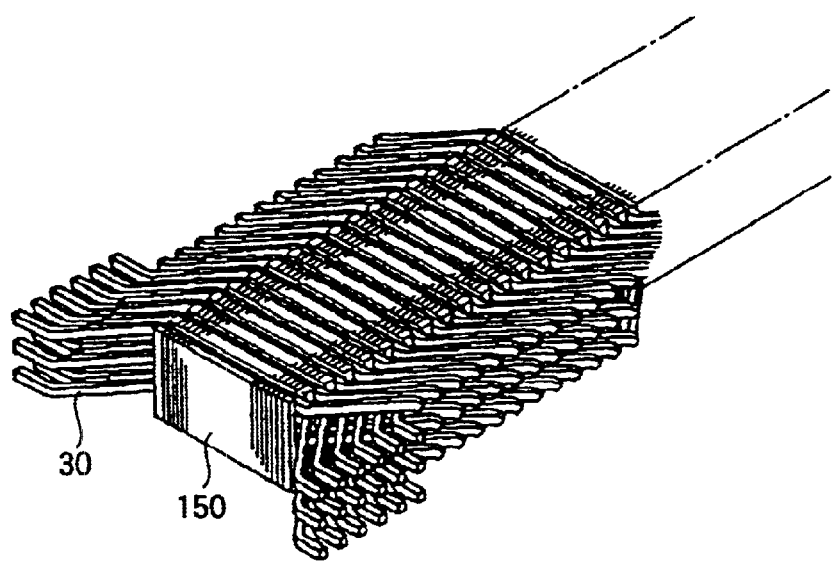
FIG. 8 is a perspective view showing a method of assembling the stator for the rotary machine according to the embodiment 2 of this invention.

FIG. 6 is a perspective view showing a stator for a rotary machine according to an embodiment 2 of this invention. FIGS. 7 and 8 are process views of inserting a coil group into a stator iron core. In this embodiment, unlike the above embodiment 1, there are three pairs of stator coil groups 16 composed of a long copper wire 30 having a rectangular cross section of 1.6 mm long×1.4 mm wide×R 0.2 mm at corner part.

Figure 9:
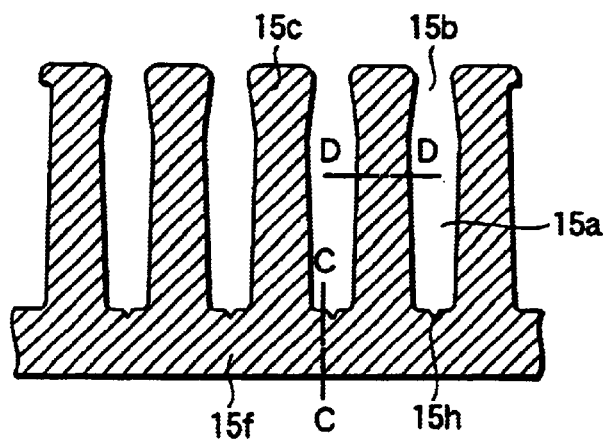
FIG. 9 is a cross-sectional view showing a part of a laminated iron core in the stator for the rotary machine according to the embodiment 2 of this invention.
Figure 9:
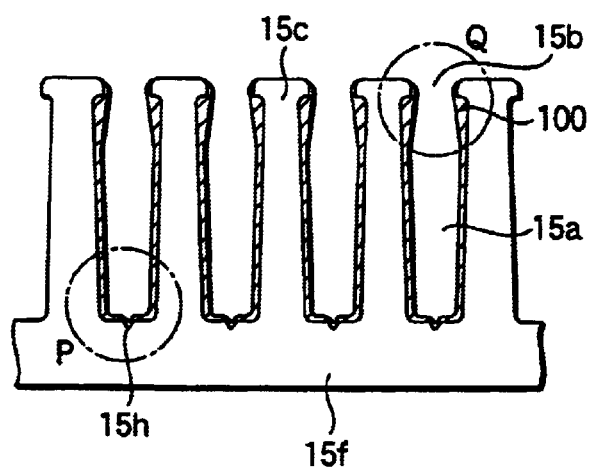
Figure 9:
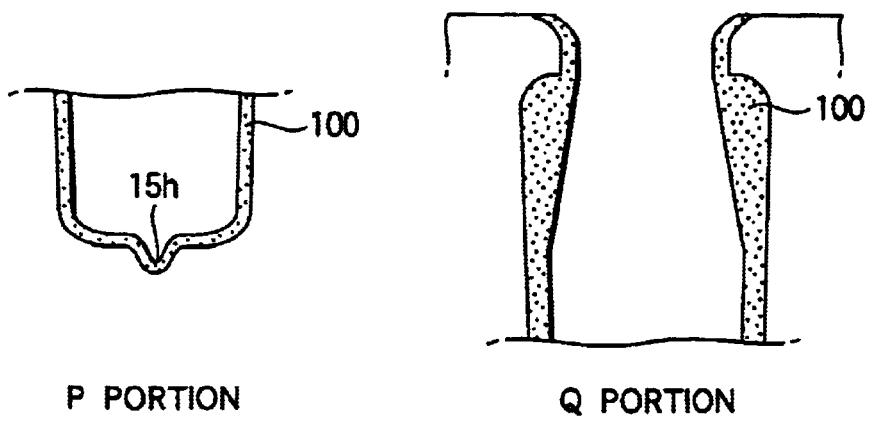

FIG. 9 is an external view and a partial cross sectional view of a stator iron core for a rotary machine in a circumferential direction of slot, according to the embodiment 2 of this invention. As shown in FIG. 9, the insulating resin 100 is coated to be thinner on the inner wall face of the slot 15a on the outer circumferential side of the stator iron core than any other portion. This is because when the straight laminated iron core 150 is formed cylindrically, the inner wall face of the slot 15a on the outer circumferential side of the stator iron core is displaced more greatly than any other inner wall face, and if the insulating resin 100 is coated too thick, the crack is likely to occur.

A notch 15h is provided on the inner wall face of the slot 15a on the outer circumferential back of the stator iron core. Since due to this notch 15h, the displacement on the iron core in forming the straight laminated iron core 150 cylindrically is concentrated on a notch portion 15g, so that the displacement of other portion for the core back can be suppressed, thereby preventing the exfoliation of the insulating resin 100. Also, the laminated iron core 150 can be easily bent, and a high roundness can be obtained. Further, there is the effect of contributing to the attenuation of electromagneticnoise. Note that when the insulating resin 100 is coated, the resin applied on the notch 15h is desirably thinner than any other portion on the inner wall face of the slot 15a. This is because when the laminated iron core 150 is bent, a displacement is concentrated near the notch 15h, so that if the insulating resin 100 is coated too thick, the crack is more likely to occur. Note that even if the minute crack occurs, a short-circuit failure is difficult to arise due to interference with the stator coil group 16, because of a space with the notch 15h.

Figure 10:
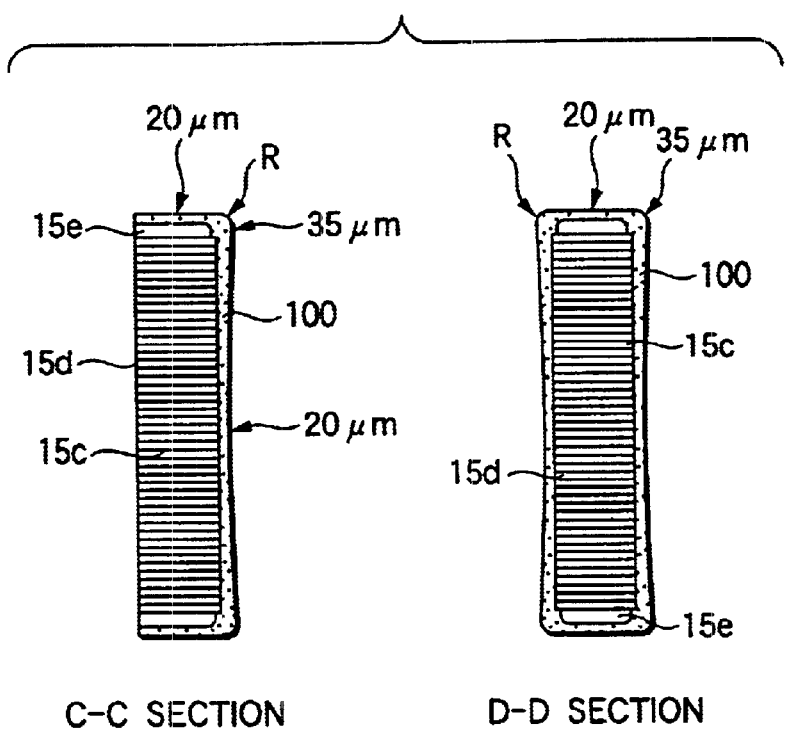
FIG. 10 is a cross-sectional view showing a part of the laminated iron core in the stator for the rotary machine according to the embodiment 2 of this invention.

FIG. 10 is an axial cross sectional view of the core back portion and the teeth portion for the laminated iron core as shown in FIG. 9. As shown in FIG. 10, the thickness of a laminated plate 15d in the central portion in a slot depth direction is 0.35 µm, while the thickness of a laminated plate 15e at the end side is 0.5 µm and the insulating resin 100 near the opening edge of the slot 15a is thicker, and formed in the R shape. When the stator coil 16 is inserted into the laminated iron core 150 and formed cylindrically, the stator coil 16 makes contact near the opening edge of the slot 15a on the end face of the stator iron core 15f. Hence, it is apprehended that an excessive stress is produced to damage the insulating film. The insulating resin 100 in this portion is thicker and of R shape, and the corner portion of the laminated plate 15e on the end side is tapered. Thereby, the stator coil 16 is less damaged near the opening edge of the slot 15a, and the insulating resin 100 is less exfoliated, to prevent the insulating film from being damaged, and improve the insulating ability.

As shown in FIG. 9, when the stator coil 16 is inserted into the laminated iron core 150, or molded cylindrically, the insulating resin 100 is formed thicker to secure the insulation near the opening edge of the slot 15a on the inner circumferential side. In this way, the damage of the insulating film due to interference of the stator coil 16 with the opening edge of the slot 15a at the time of insertion, or the exfoliation of the insulating resin 100 can be prevented. Though the top end of the teeth 15c is reduced or deformed circumferentially when molded cylindrically, the insulation can be also secured. In order to increase the film thickness of the opening edge on the inner circumferential side, the insulating resin 100 is coated from the opening of slot 15a on the inner circumferential side in this embodiment, unlike the embodiment 1.

In this embodiment, the cross-sectional shape of the coil element wire 30 is not circular as in the embodiment 1, but may be rectangular. When the coil element wire 30 has a circular cross section, the stator coil 16 and the inner wall face of the slot 15a are placed into point contact, due to circular cross section, producing an excessive stress at the contact portion. However, if the coil element wire 30 has a rectangular cross section in this embodiment, the stator coil 16 and the inner wall face of the slot 15a are placed into line contact, suppressing excessive stress at the contact portion, so that the exfoliation of the insulating resin 100 and the damage of the insulating film for the coil can be prevented. (Embodiment 3)

Figure 11:
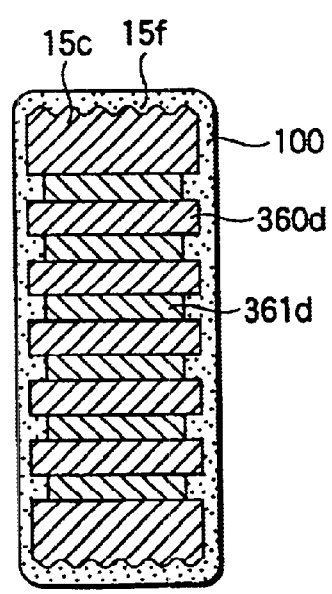
FIG. 11 is a cross-sectional view showing the teeth in a stator for a rotary machine according to an embodiment 3 of this invention.

FIG. 11 is a circumferential cross sectional view showing the teeth in the stator iron core of the stator for rotary machine according to an embodiment 3 of this invention. As shown in FIG. 11, an end face 15f of the stator iron core 15 is formed irregularly. Thereby, the end face 15f of the stator iron core 15 and the insulating resin 100 are contacted more intimately, and the exfoliation of the insulating resin 100 can be prevented when the stator coil 16 is inserted into the slot 15a. Also, the formation of irregular shape may be made in a surface treatment process such as a shot process.

Figure 12:
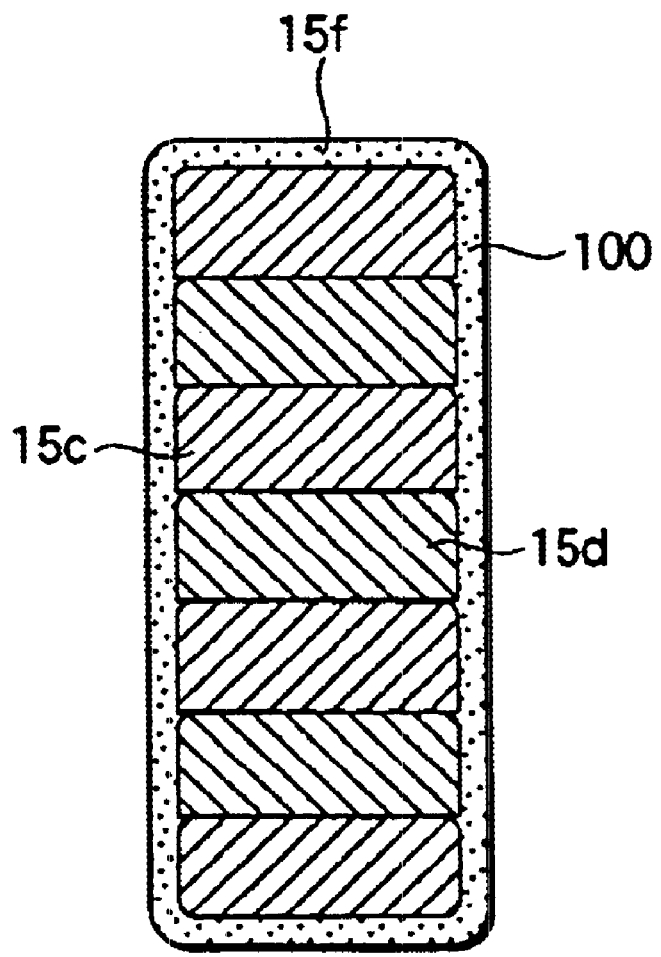
FIG. 12 is a cross-sectional view showing the teeth in the stator for the rotary machine according to the embodiment 3 of this invention.
Figure 13:
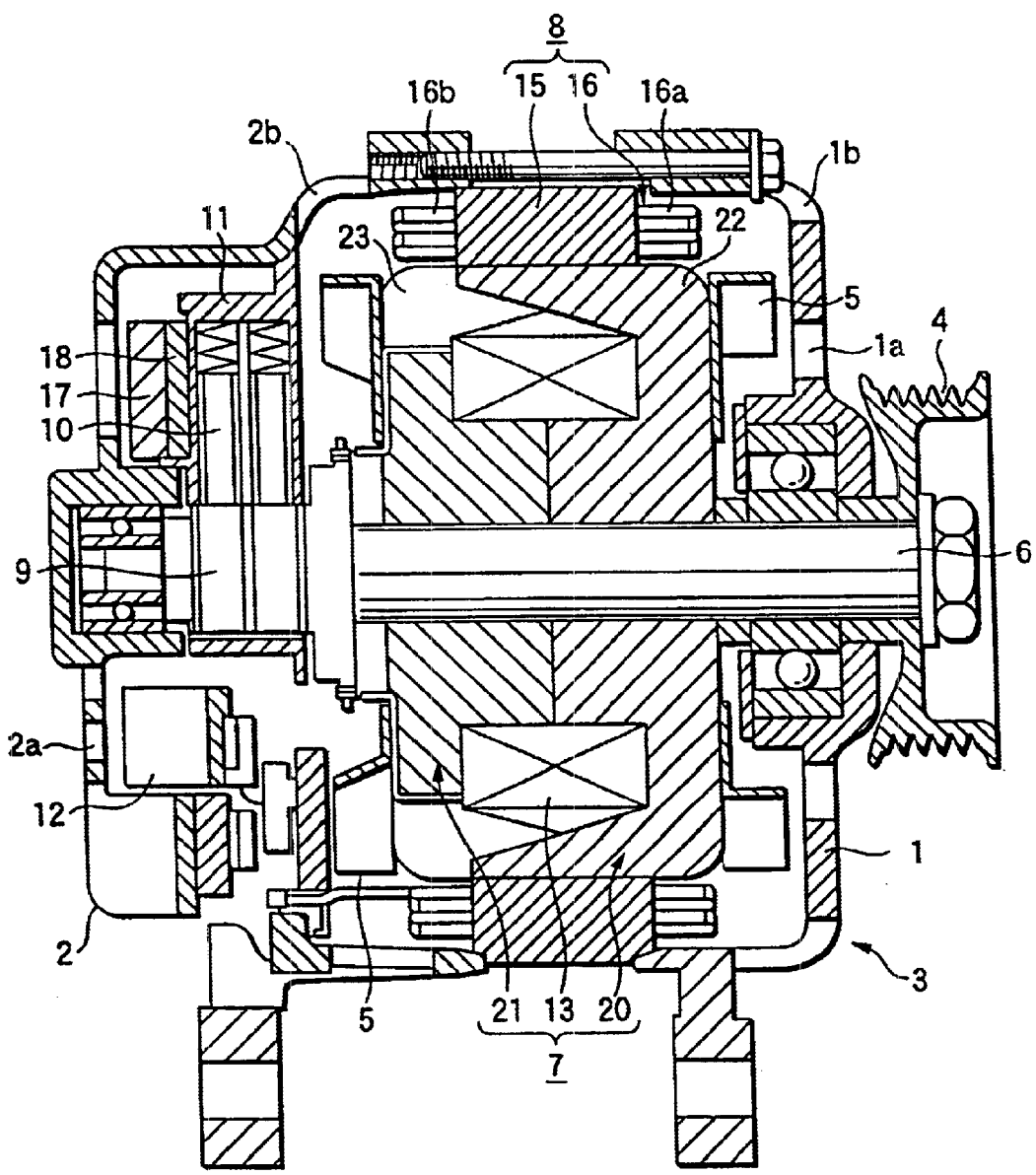
FIG. 13 is across-sectional view showing the conventional rotary machine.
Figure 14:
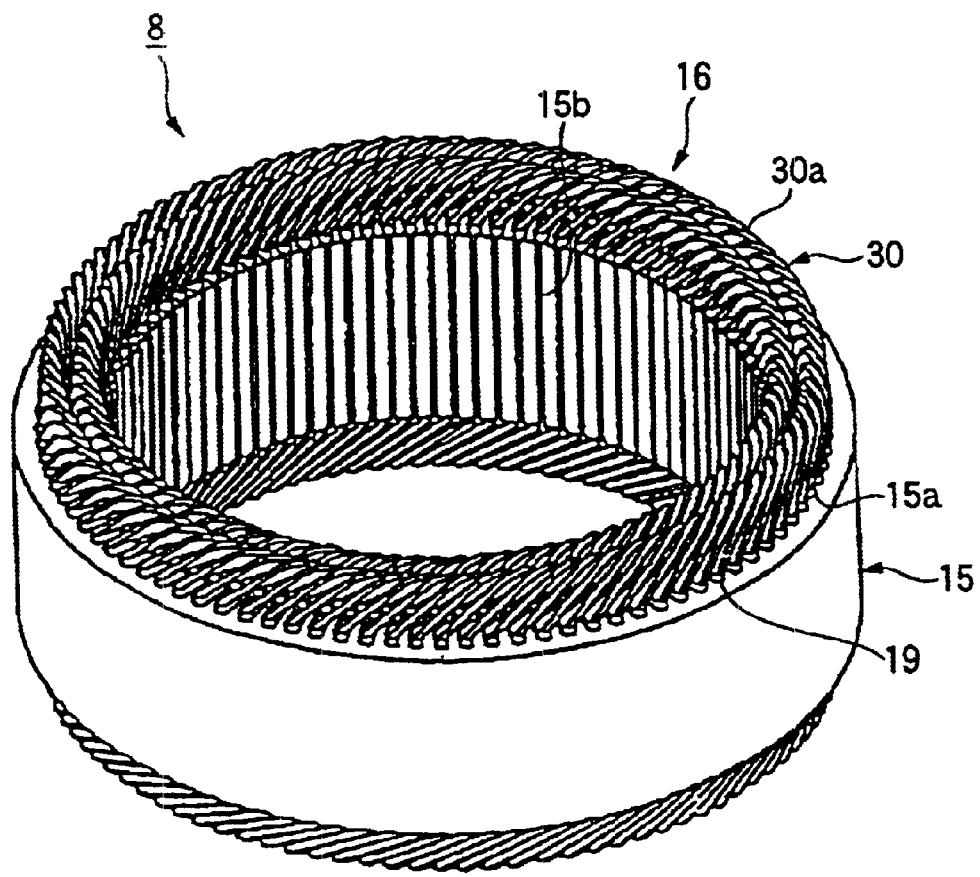
FIG. 14 is a perspective view showing the stator for the conventional rotary machine.
Figure 15:
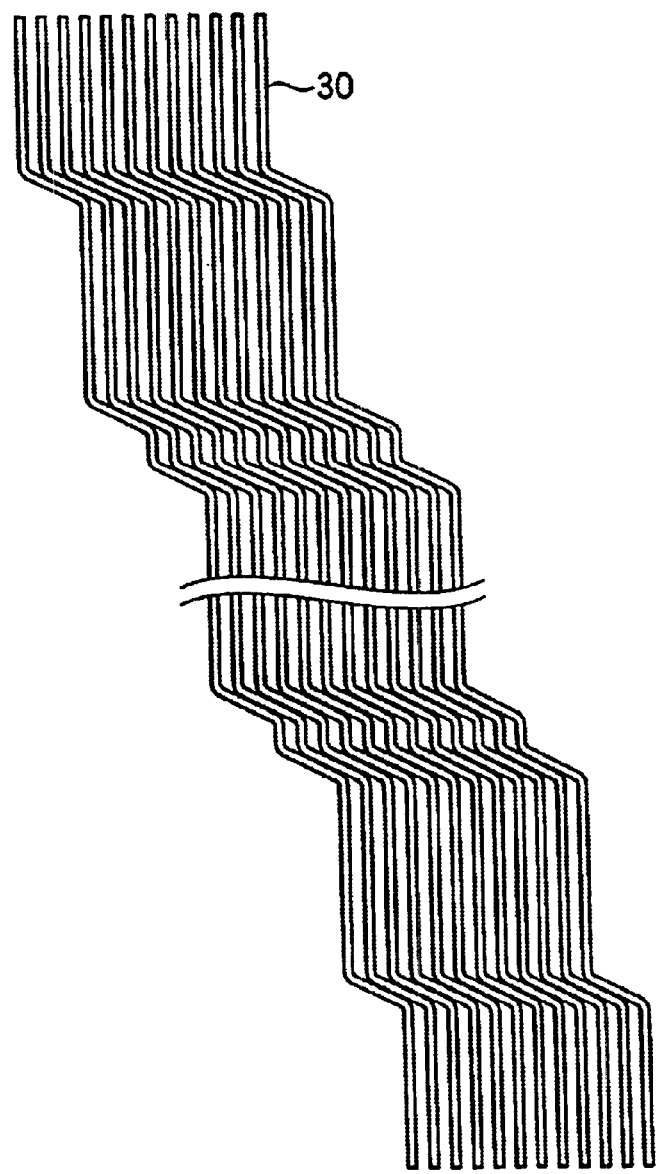
FIG. 15 is a perspective view showing the coil element wire in the stator for the conventional rotary machine.
Figure 16:
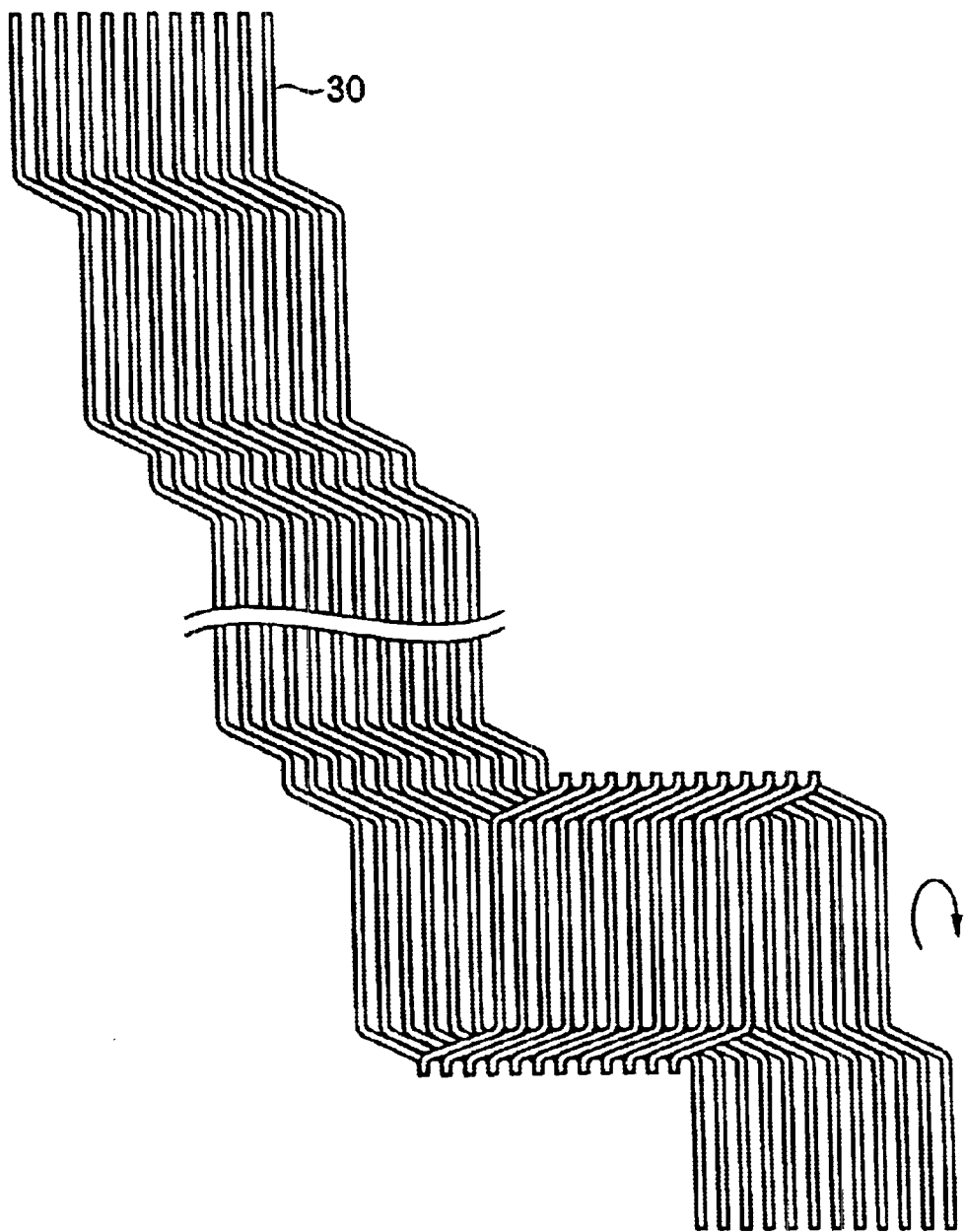
FIG. 16 is a perspective view showing the coil element wire in the stator for the conventional rotary machine.
Figures 17A, 17B:
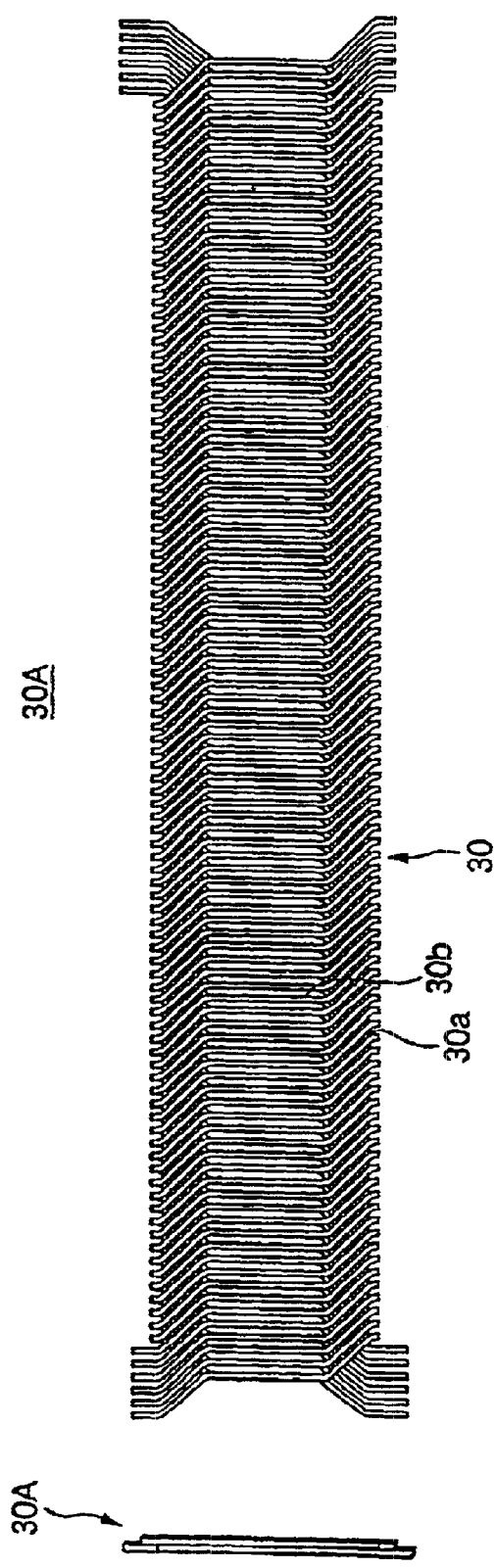
FIGS. 17A and 17B are overall views showing the coil element wire in the stator for the conventional rotary machine.
Figure 18B:
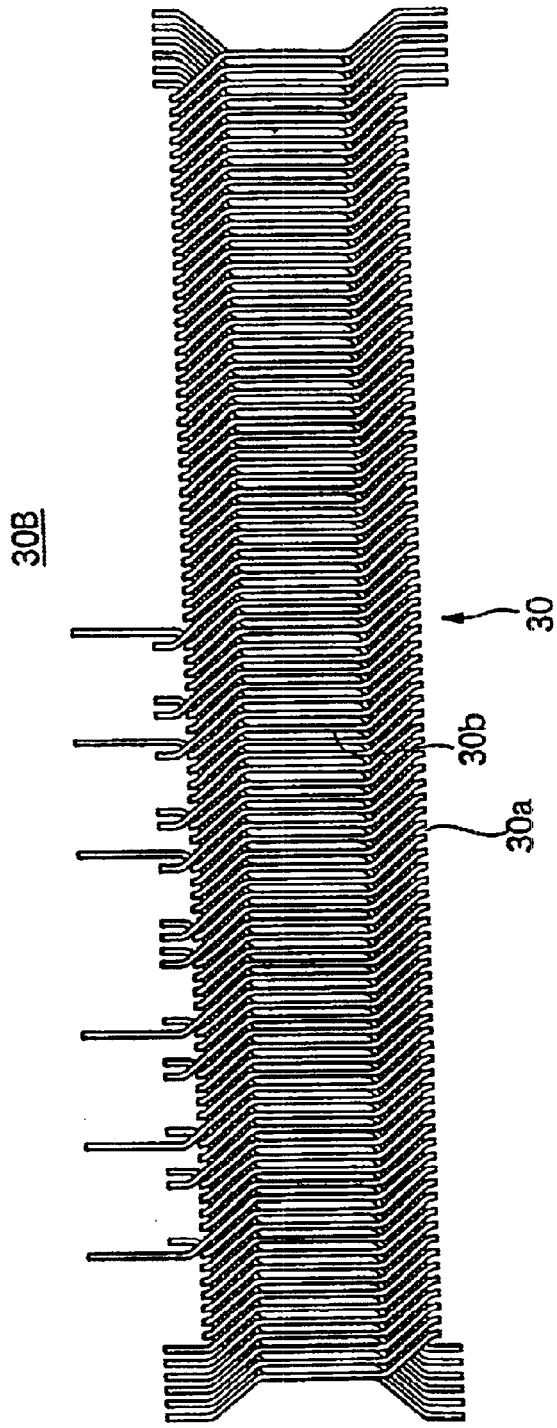
FIGS. 18A and 18B are overall views showing the coil element wire in the stator for the conventional rotary machine.
Figure 18A:
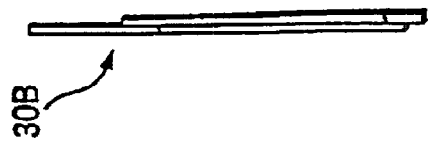
Figure 19:
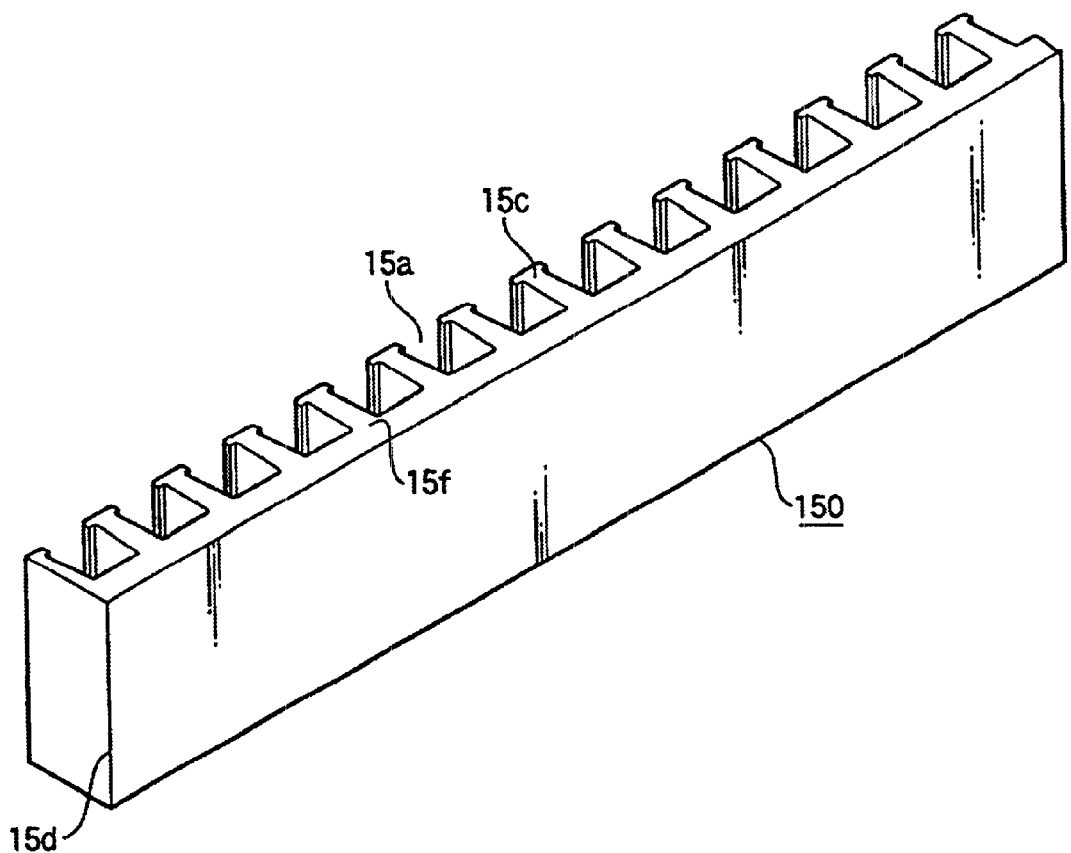
FIG. 19 is a perspective view showing the laminated iron core in the stator for the conventional rotary machine.
Figure 20A:
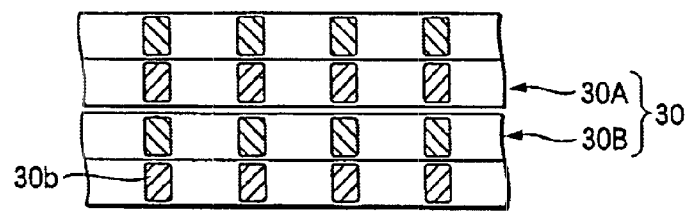
FIGS. 20A to 20C are perspective views showing a method of assembling the stator iron core in the stator for the conventional rotary machine.
Figure 20B:
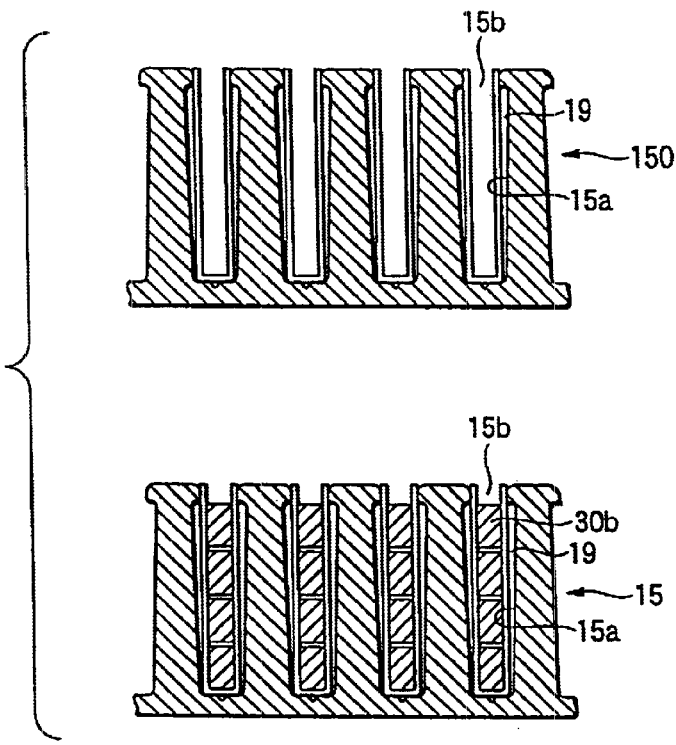
Figure 20C:
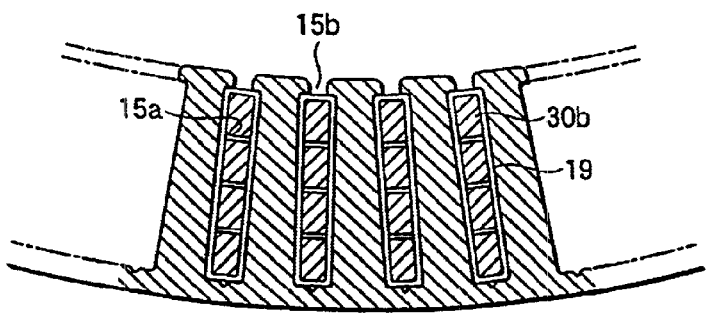
Figure 21:
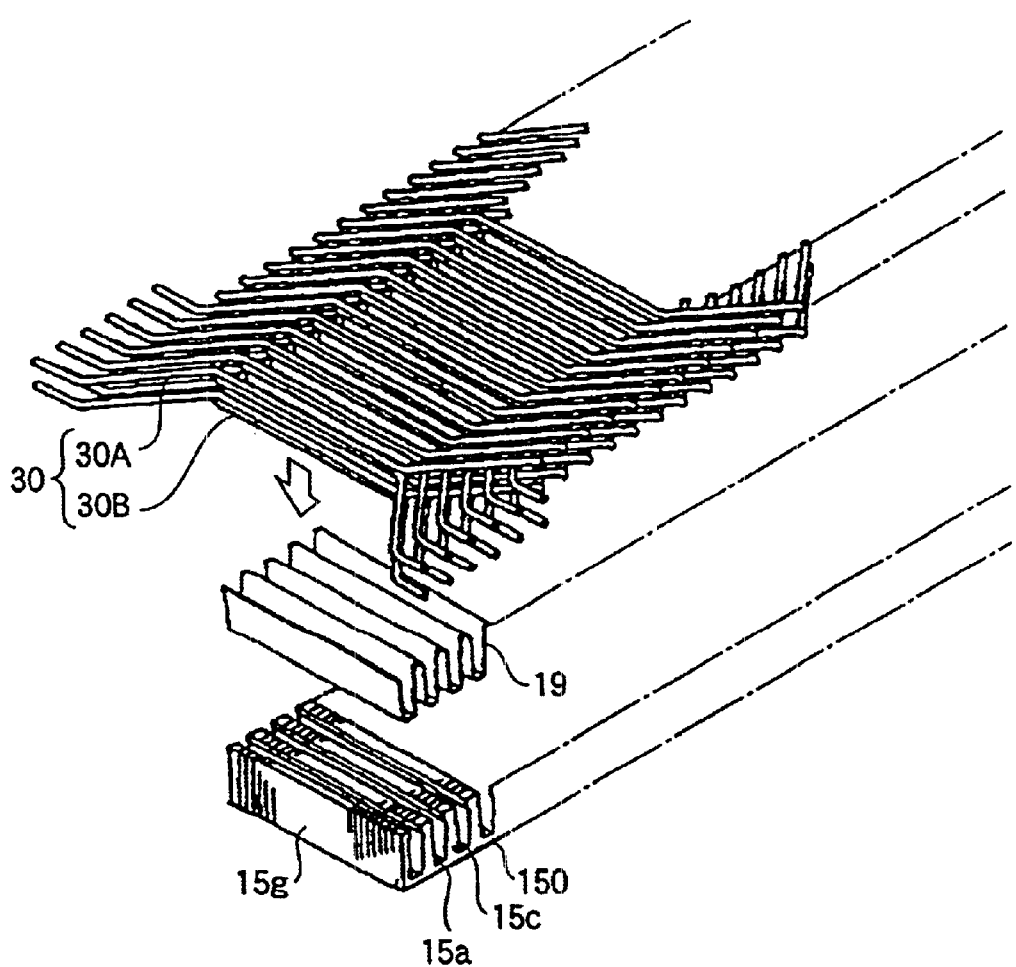
FIG. 21 is a cross-sectional view showing a method of assembling the stator iron core in the stator for the conventional rotary machine.

The same effects can be obtained by forming irregularities on the inner wall face of a slot 24 as shown in FIG. 11. The formation of irregularities can be made, for example, by alternately laminating a laminated plate 360d having a larger size in the circumferential direction of the stator iron core and a laminated plate 361d having a smaller size, when the stator iron core 15 is fabricated by laminating a steel plate sheet with a slot shape punched. Also, the irregularities may be formed by laminating the laminated plate having the same width in the circumferential direction, alternately shifted. Also, the irregularities may be formed by making the corner portion of the laminated plate 15d like R shape, as shown in FIG. 12.

In the above embodiments, the insulating resin 100 is coated on the laminated iron core 150, and the stator coil 16 is wound around this laminated iron core 150, then both ends 15g of the laminated iron core 150 are brought into contact to form the cylindrical stator iron core 15. However, the same effects can be obtained by winding the stator coil 16 around the stator iron core 15 after forming the cylindrical stator iron core 15.

The stator coil is supposed to be a long coil element wire 30 being like the shape of a bolt of lightning. However, the invention is not limited to such stator coil. For example, various conductor segments (e.g., substantially U character, substantially I character, substantially J character conductor segments) may be adopted to attain the same effects. A non-aligned wave winding may be employed as disclosed in JP-A-9-10352. In this case, a method may be taken of molding the stator coil in an aligned state within the slot and inserting it into the slot as disclosed in the same patent, thereby enabling the simple fabrication.

According to this invention, the stator iron core has a laminated iron core with a plurality of axially extending slots formed at a predetermined pitch along a circumferential direction, an insulating resin is coated at least on an axial end face of the stator iron core and an inner wall face of a slot in the laminated iron core to provide insulation between the stator iron core and the stator coil, and the laminated iron core is formed in a cylindrical shape by bringing both circumferential end portions of the laminated iron core into contact with each other in such a way as to bend the laminated iron core so that an opening face of the slot on the inner circumferential side may be directed inside. Therefore, there is the effect that the stator for the rotary machine has a high insulation and cooling performance, and can be produced in a simple manner with high quality and low costs.

According to this invention, the insulating resin is coated to be thicker on the axial end face of the stator iron core than on the inner wall face of the slot on the axially central portion. Therefore, there is the effect that the insulation film for the coil is prevented from damaging and the insulation property can be improved.

According to this invention, the insulating resin is coated to be thicker near an opening face of the stator iron core on the inner circumferential side than any other portion of the inner wall face of the slot. Therefore, there is the effect that the insulation film for the coil can be prevented from damaging and the insulating resin prevented from exfoliating.

According to this invention, the insulating resin is coated to take an R shape or chamfered shape on the axial end face of the stator iron core. Therefore, there is the effect that the insulation film for the coil is prevented from damaging and the insulation property can be improved.

According to this invention, the insulating resin is coated to take an R shape or chamfered shape on the axial end face of the stator iron core. Therefore, there is the effect that the insulating resin can be easily coated to take the R shape near the opening edge of slot.

According to this invention, the insulating resin on the axial end face of the stator iron core is coated to be thicker on the inner diameter side of a core back neutral axis than on the outer diameter side. Therefore, there is the effect that the insulating resin can be prevented from cracking at the opening edge of slot.

According to this invention, the insulating resin on the inner wall face of the slot is coated thinner on the outer circumferential side of the stator iron core than any other portion of the inner wall face. Therefore, there is the effect that the insulating resin can be prevented from cracking on the inner wall face of slot.

According to this invention, a notch is provided on the inner wall face of the slot on the outer circumferential side of the stator iron core, and the insulating resin is coated to be thinner in the notch than any other portion of the inner wall face. Therefore, there is the effect that the insulating resin can be prevented from cracking on the inner wall face of slot According to this invention, the axial end face of the stator iron core is formed in an irregular form. Therefore, there is the effect that the insulating resin can be contacted more closely with the end face of the stator iron core and prevented from exfoliating.

According to this invention, the inner wall face of the slot is formed in the irregular form. Therefore, there is the effect that the insulating resin can be contacted more closely with the inner wall face of slot and prevented from exfoliating.

According to of this invention, the insulating resin is coated to be thinner on the both ends of the laminated iron core in the circumferential direction than any other portion of the laminated iron core. Therefore, there is the effect that the insulating resin can be prevented from cracking at the contact portion at the time of cylindrical molding. Further, there is the effect that the magnetic resistance is prevented from being worse by suppressing the occurrence of gap at the contact portion.

According to this invention, the insulating resin is epoxy based insulating resin. Therefore, there is the effect that the insulating resin is more likely to permeate the applied object and be coated uniformly.

According to this invention, the insulating resin is silicone based insulating resin. Therefore, there is the effect that the electromagnetic sound can be reduced owing to an oscillation attenuating effect.

According to this invention, the stator coil is inserted into the slot to be aligned in one row in a diameter direction of the stator iron core. Therefore, there is the effect that the coil insertion is made regularly, the insulating resin is prevented from damaging, and the insulating property is improved.

According to this invention, the stator coil has a substantially rectangular shape in cross section. Therefore, there is the effect that the insulating resin is prevented from being damaged at the time of molding, and the stator coil can be easily bend and fabricated in a simple manner.

According to this invention, the stator coil has a plurality of coils folded back outside the slot on the end face side of the stator iron core and wound to take alternately an inner layer and an outer layer in a slot depth direction within the slot for every predetermined number of slots, and a turn portion of the coil element wire folded back outside the slot on the end face side of the stator iron core is aligned in the circumferential direction to constitute a coil end group. Therefore, there is the effect that the stator for the rotary machine can be obtained with high quality and low costs.

According to the invention, there is provided a method for manufacturing a stator for a rotary machine including a step of forming a laminated iron core by laminating a straight steel plate sheet with a slot shape punched, a step of coating an insulating resin at least on an axial end face of a stator iron core and on an inner wall face of a slot in the laminated iron core, a step of forming the cylindrical stator iron core by placing the both circumferential ends of the laminated iron core coated with the insulating resin into contact with each other, and a step of winding a stator coil around the stator iron core. Therefore, there is the effect that the method for manufacturing the stator for the rotary machine, in which the stator has a high insulating and cooling performance, and can be fabricated in a simple manner, with high quality and low costs.

Also, according to the invention, there is provided a method for manufacturing a stator for a rotary machine including a step of forming a laminated iron core by laminating a straight steel plate sheet with a slot shape punched, a step of coating an insulating resin at least on an axial end face of a stator iron core and on an inner wall face of a slot in the laminated iron core, a step of winding a stator coil around the laminated iron core coated with the insulating resin, and a step of forming the cylindrical stator iron core by placing both circumferential ends of the laminated iron core having the stator coil wound into contact with each other. Therefore, there is the effect that the method for manufacturing the stator for the rotary machine, in which the stator has a high insulating and cooling performance, and can be fabricated in a simple manner, with high quality and low costs.

According to the invention, the insulating resin is applied by electrostatic powder coating. Therefore, there is the effect that the insulating resin is more likely to permeate the applied object and be coated uniformly.

According to the invention, the insulating resin is applied from an opening face of the slot on the inner circumferential side of the stator iron core. Therefore, there is the effect that the film thickness of the opening edge on the inner circumferential side can be formed greater.

According to the invention, the insulating resin is applied on the stator iron core in an axial direction. Therefore, there is the effect that the insulating resin can be easily coated, and the stator can be fabricated in a simple manner.

According to the invention, the stator coil is molded beforehand in an arranged state within the slot, and then inserted into the slot. Therefore, there is the effect that the stator can be fabricated in a simple manner.

What is claimed is:

1. A stator of a rotary machine, comprising:

a rotor; and a stator having a stator iron core disposed around an outer circumference of said rotor and a stator coil fitted around said stator iron core, wherein said stator iron core has a laminated iron core with a plurality of axially extending slots formed at a predetermined pitch, an insulating resin is coated at least on an axial end face of said stator iron core and an inner wall face of a slot in said laminated iron core to provide insulation between said stator iron core and said stator coil, and said laminated iron core is formed in a cylindrical shape by bringing both circumferential end portions of said laminated iron core into contact with each other in such a way as to bend said laminated iron core so that an opening face of said slot may be directed inside, wherein a notch is provided on the inner wall face of said slot on the outer circumferential side of said stator iron core, and the insulating resin is coated thinner in said notch than any other portion of said inner wall face.

2. The stator for the rotary machine according to claim 1, wherein the stator coil is inserted into the slot to be aligned in one row in a diameter direction of said stator iron core.

3. The stator for the rotary machine according to claim 1, wherein said stator coil has a plurality of coils folded back outside said slot on the end face side of said stator iron core and wound to take alternately an inner layer and an outer layer in a slot depth direction within said slot for every predetermined number of slots, and a turn portion of said coil element wire folded back outside said slot on the end face side of said stator iron core is aligned in the circumferential direction to constitute a coil end group.

4. A method of manufacturing a stator for a rotary machine, comprising:

forming a laminated iron core by laminating a straight steel plate sheet with a slot shape punched;

coating an insulating resin at least on an axial end face of a stator iron core and on an inner wall face of a slot in said laminated iron core, wherein a notch is provided on the inner wall face of said slot on the outer circumferential side of said stator iron core, and the insulating resin is coated thinner in said notch than any other portion of said inner wall face;

winding a stator coil around said laminated iron core coated with the insulating resin; and after said winding, forming the cylindrical stator iron core by placing both circumferential ends of said laminated iron core into contact with each other.

* * * * *